Nov. 1, 1932.   H. A. WILEY   1,886,071
BATTERY REPLACEMENT BOX
Filed April 9, 1931
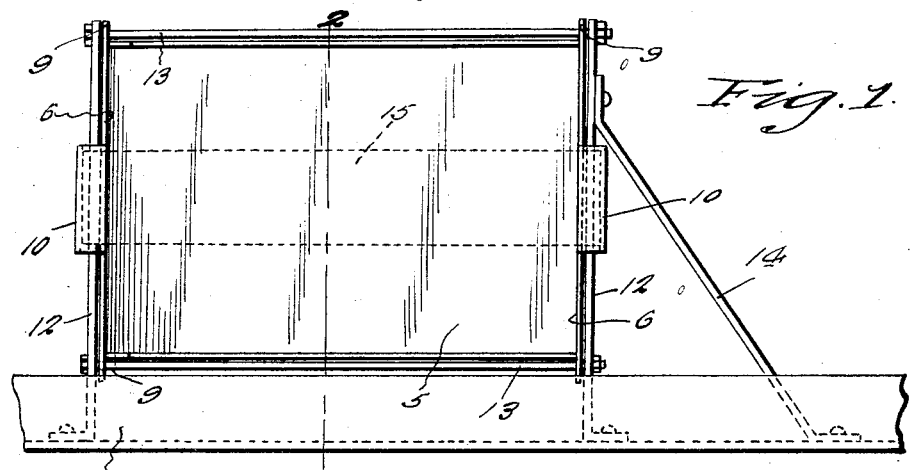
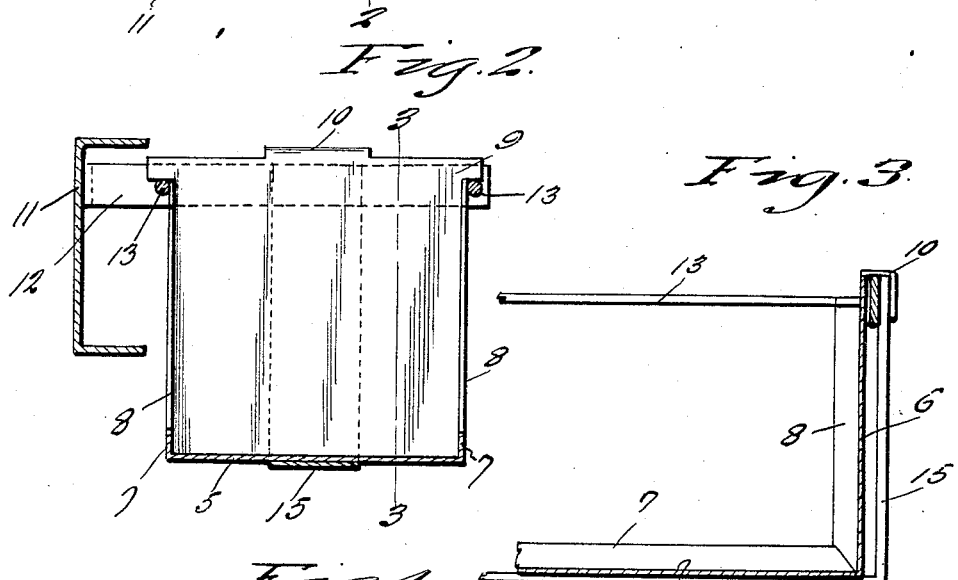
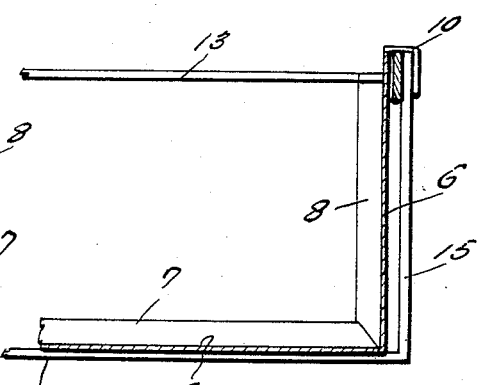
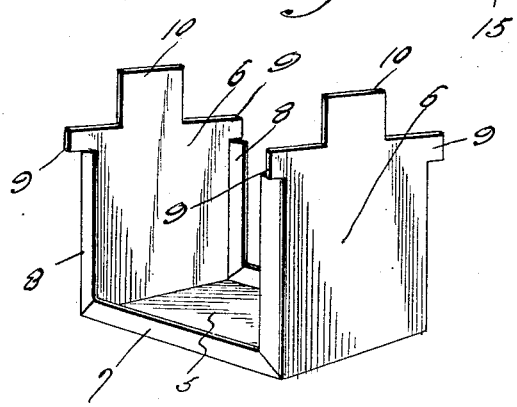
Inventor
Hugh A. Wiley
By Clarence A. O'Brien
Attorney Patented Nov. 1, 1932

1,886,071

UNITED STATES PATENT OFFICE

HUGH A. WILEY, OF MEMPHIS, TENNESSEE

BATTERY REPLACEMENT BOX

Application filed April 9, 1931. Serial No. 528,962.

This invention relates broadly to cradles or supports for a battery for holding and positioning the battery in the usual hanger frame provided on a vehicle for accommodating a battery, and the primary object of this invention is to provide what may be termed a replacement box or saddle that can be used with the conventional type of hanger frame for supporting the battery in the frame.

A still further object of the invention is to provide in a device of the character above mentioned, a replacement box or saddle which may be supported directly from the frame thus relieving the usual supporting strap of the frame of the full weight of the battery with the result, in the event the supporting strap should break, the possibility of the battery falling through the hanger frame is obviated.

A still further object of the invention is to provide a replacement box or saddle for a battery which may be used with the conventional hanger frame either subsequent to the breaking of the supporting strap or even when the strap is in good condition.

Other objects and advantages of the invention will become apparent from a study of the following description, taken in connection with the accompanying drawing wherein:

Figure 1 is a top plan view of the replacement box, the same being positioned in the usual battery suspension or hanger frame.

Figure 2 is a vertical transverse sectional view taken substantially on the line 2—2 of Figure 1.

Figure 3 is a vertical fragmentary detail sectional view taken substantially on the line 3—3 of Figure 2.

Figure 4 is a perspective view of the replacement box, involving the features of the present invention.

Referring more in detail to the drawing, and in particular to Figure 4, it will be seen that my improved battery replacement box is preferably stamped from a single blank of metal or like suitable material that is bent on two relatively spaced transverse fold lines so as to provide a substantially U-shaped box or receptacle including a body 5 and end walls 6 rising from said bottom. The bottom 5 at opposite edges thereof is provided with flanges 7 that project upwardly from the bottom, while the end walls 6 at opposite edges thereof are provided with inwardly directed flanges 8 forming continuations of the flanges 7 and serving to retain the battery in the box against lateral or transverse movement relative to the box.

Each of the end walls 6 adjacent its upper edge is provided with oppositely extending lateral projections 9 for suspending the replacement box in the hanger frame in a manner to be hereinafter made apparent.

Each of said end walls, at the upper end thereof is also provided with an extension 10 adapted to be bent upon itself in the form of a hook for engaging a member of the hanger frame to serve as a further means for suspending the replacement box in said hanger frame.

The purpose and use of the replacement box will be apparent from the following: In Figure 1 11 designates a portion of one of the chassis bars of an automobile of a well known make, and the battery suspension or hanger frame in the present instance comprises a pair of parallel end members or arms 12 bolted at one end to a flange of the chassis bar 11 and projecting laterally inwardly from said bar. The members 12 are connected by a pair of relatively spaced tie bolts 13 and as is conventional, one of the members 12 is braced with respect to the chassis bar 11 through the medium of a brace bar 14. The structure thus described is conventional and a more detail description thereof is accordingly deemed unnecessary.

As is also conventional, suspended between the members 12 is a substantially U-shaped strap 15 that at its ends is suitably secured to intermediate portions of the members 12.

Heretofore, it has been the practice to place the battery within the hanger frame, the battery resting on and being supported by the strap 15, with the result that in the event the strap 15 should break the battery was liable to slip through the frame often resulting in injury to the battery. According to the present invention, my improved battery replacement box is disposed within the frame between the members 12 and tie bolts 13 and the bottom 5 may rest on the intermediate portion of the strap 15 with the lugs or extensions 9 engaging the tie bolts 13, and the projections 10 bent upon themselves in the form of hooks and disposed over the members 12, and in the present instance being in overlapping relation with respect to the ends of the strap 15. (See Figure 3.)

When the replacement box is so positioned in the hanger frame, it will be apparent that the weight thereof is not solely on the strap 15 but that through the medium of the lugs 9 and the projections 10 the frame itself aids in supporting the weight of the box and the battery arranged in the box.

When the box is so positioned in the frame, the battery may be placed therein, and through the medium of the walls 6 and flanges 7, 8, will be retained in the box against casual displacement relative thereto.

It is of course to be understood, that either the extensions 10 or the lugs 9 may be dispensed with according to the particular type of suspension frame with which the box is to be used, as obviously either the lugs 9 or the projections 10 will admirably serve as hanger means for the replacement box.

Even though I have herein shown and described the preferred embodiment of the invention, it is to be understood that the same is susceptible of changes, modifications and improvements coming within the scope of the appended claim.

Having thus described my invention, what I claim as new is:

A battery replacement box formed from a single sheet of metal bent on two parallel transverse fold lines into a substantial U whereby to provide a bottom and opposed sides, said plate at relatively opposite edges of said sides and bottom being bent at substantially right angles to provide opposed parallel flanges extending lengthwise of the sides and bottom, and said plate at relatively opposite ends thereof being reduced in width to provide extensions for said sides bent upon themselves to form hooks.

In testimony whereof I affix my signature.

HUGH A. WILEY.